(12) United States Patent
Heitkamp et al.

(10) Patent No.: US 10,059,376 B2
(45) Date of Patent: Aug. 28, 2018

(54) MOTOR VEHICLE COLUMN WITH REINFORCEMENT SHEET AND METHOD FOR THE PRODUCTION THEREOF

(71) Applicant: BENTELER AUTOMOBILTECHNIK GMBH, Paderborn (DE)

(72) Inventors: Magnus Heitkamp, Bielefeld (DE); Achim Kröning, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 15/142,772

(22) Filed: Apr. 29, 2016

(65) Prior Publication Data

US 2017/0008568 A1    Jan. 12, 2017

(30) Foreign Application Priority Data

Apr. 30, 2015    (DE) .................. 10 2015 106 812

(51) Int. Cl.
*B60J 7/00*         (2006.01)
*B62D 25/04*        (2006.01)
*B62D 29/00*        (2006.01)

(52) U.S. Cl.
CPC .......... *B62D 25/04* (2013.01); *B62D 29/008* (2013.01)

(58) Field of Classification Search
CPC ........ B29C 66/71; B62D 1/184; B62D 25/04; H01L 2924/00; A61B 2046/236; H05K 7/1497; H05K 7/20745; H05K 7/20836; H05K 7/20736; G06F 1/20
USPC ............. 296/193.06, 146.6, 187.12
See application file for complete search history.

(56) References Cited

U.S. PATENT DOCUMENTS

| 5,938,275 A * | 8/1999 | Kleinhans | B62D 25/02 296/191 |
| 6,554,345 B2 * | 4/2003 | Jonsson | B60J 5/0444 296/146.6 |
| 7,201,413 B2 | 4/2007 | Hillekes et al. | |
| 7,445,269 B2 * | 11/2008 | Yustick | B62D 21/157 296/187.01 |
| 8,419,113 B2 * | 4/2013 | Kunishi | B62D 21/157 296/187.12 |
| 8,491,047 B1 * | 7/2013 | Moll | B62D 25/04 296/193.06 |

(Continued)

FOREIGN PATENT DOCUMENTS

CN          101565059      10/2009
DE    10 2011 120 519 A1   6/2013
(Continued)

OTHER PUBLICATIONS

Chinese Search Report dated Dec. 1, 2017 with respect to counterpart Chinese patent application 2016105427125.

(Continued)

*Primary Examiner* — Kiran B Patel
(74) *Attorney, Agent, or Firm* — Henry M. Feiereisen LLC (57) ABSTRACT

A motor vehicle column and a method for production of the motor vehicle column are disclosed, wherein in the motor vehicle column a reinforcement sheet having an inwardly oriented bead is arranged and the reinforcement sheet has an inwardly oriented bead. The reinforcement sheet contacts the outer sheet in at least two sections viewed in cross section so as to form a double layer.

14 Claims, 7 Drawing Sheets

(56) References Cited

U.S. PATENT DOCUMENTS

| | | | | |
|---|---|---|---|---|
| 8,684,449 B2* | 4/2014 | Bodin | | B62D 29/007 |
| | | | | 296/187.12 |
| 9,315,215 B2* | 4/2016 | Heo | | B62D 25/04 |
| 9,327,622 B2* | 5/2016 | Ikeda | | B60N 2/68 |
| 9,394,006 B2* | 7/2016 | Sakuragi | | B62D 25/04 |
| 9,457,844 B2* | 10/2016 | Yoshida | | B62D 25/04 |
| 9,623,910 B2* | 4/2017 | Kiyoshita | | B62D 21/152 |
| 9,630,652 B2* | 4/2017 | Balur | | B62D 25/04 |
| 9,637,173 B2* | 5/2017 | Nishimura | | B62D 21/157 |
| 2002/0069506 A1 | 6/2002 | Brodt et al. | | |
| 2009/0085379 A1 | 4/2009 | Takahashi et al. | | |
| 2011/0241384 A1* | 10/2011 | Mori | | B62D 25/04 |
| | | | | 296/193.06 |
| 2012/0119477 A1* | 5/2012 | Kim | | B62D 25/04 |
| | | | | 280/801.2 |
| 2012/0256445 A1* | 10/2012 | Baccouche | | B62D 25/04 |
| | | | | 296/193.06 |
| 2012/0267882 A1* | 10/2012 | Hamlett | | B62D 21/157 |
| | | | | 280/735 |
| 2013/0020833 A1* | 1/2013 | Yao | | B60R 22/24 |
| | | | | 296/193.06 |
| 2013/0113237 A1* | 5/2013 | Huhn | | B21D 53/88 |
| | | | | 296/193.05 |
| 2013/0187410 A1 | 7/2013 | Wawers | | |
| 2013/0193716 A1* | 8/2013 | Kurokawa | | B62D 25/06 |
| | | | | 296/193.06 |
| 2013/0257101 A1* | 10/2013 | Shono | | B62D 25/06 |
| | | | | 296/191 |
| 2013/0264840 A1* | 10/2013 | Izumi | | B62D 25/025 |
| | | | | 296/187.12 |
| 2014/0028056 A1* | 1/2014 | Nishimura | | B62D 25/04 |
| | | | | 296/193.06 |
| 2014/0077529 A1* | 3/2014 | Kurokawa | | B62D 25/025 |
| | | | | 296/193.06 |
| 2014/0284967 A1* | 9/2014 | Torii | | B62D 21/157 |
| | | | | 296/193.06 |
| 2014/0319877 A1* | 10/2014 | Hida | | B62D 25/02 |
| | | | | 296/191 |
| 2014/0333093 A1* | 11/2014 | Matsuura | | B62D 25/02 |
| | | | | 296/187.12 |
| 2014/0354009 A1* | 12/2014 | Honda | | B62D 25/00 |
| | | | | 296/187.12 |
| 2015/0021954 A1* | 1/2015 | Hayakawa | | B62D 25/025 |
| | | | | 296/187.12 |
| 2015/0108788 A1* | 4/2015 | Ikeda | | B62D 21/157 |
| | | | | 296/187.12 |
| 2015/0115654 A1* | 4/2015 | Honda | | B62D 29/002 |
| | | | | 296/187.12 |
| 2017/0008568 A1* | 1/2017 | Heitkamp | | B62D 29/008 |

FOREIGN PATENT DOCUMENTS

| | | |
|---|---|---|
| EP | 1 195 208 A2 | 4/2002 |
| JP | 2012-136 190 A | 7/2012 |
| JP | 2013-060 044 A | 4/2013 |
| JP | 2013-233 838 A | 11/2013 |
| WO | WO 2011/071434 A1 | 6/2011 |

OTHER PUBLICATIONS

Translation of Chinese Search Report dated Dec. 1, 2017 with respect to counterpart Chinese patent application 2016105427125.

* cited by examiner

MOTOR VEHICLE COLUMN WITH REINFORCEMENT SHEET AND METHOD FOR THE PRODUCTION THEREOF

CROSS-REFERENCES TO RELATED APPLICATIONS

This application claims the priority of German Patent Application, Serial No. 10 2015 106 812.5, filed Apr. 30, 2015, pursuant to 35 U.S.C. 119(a)-(d), the content of which is incorporated herein by reference in its entirety as if fully set forth herein.

BACKGROUND OF THE INVENTION

The present invention relates to a motor vehicle column and a method for producing such a vehicle column.

The following discussion of related art is provided to assist the reader in understanding the advantages of the invention, and is not to be construed as an admission that this related art is prior art to this invention.

From the state of the art it is known to produce structural motor vehicle components from metallic materials, in particular from steel materials. For this purpose sheet metal blanks are provided that are processed by forming. However, stricter safety requirements imposed by law or demanded by manufacturers make it necessary that the components are not only cold formed from a sheet metal blank with homogenous wall thickness. In this regard different approaches exist for achieving a high stiffness at same or reduced weight.

For example the hot-forming and press-hardening technology is used in order to increase the stiffness and with this also the crash performance of a component, in particular a component having a homogenous wall thickness, while at the same time keeping the weight of the component constant.

An alternative approach is the use of reinforcement sheets and/or reinforcement patches which are welded to or glued into the component in order to again increase the stiffness and crash performance by way of a respective cross sectional configuration at constant or only slightly increased weight of the component.

Based on the state of the art it is an object of the present invention to present a possibility to significantly increase the stiffness and crash performance of a motor vehicle column without significantly increasing the component weight and at the same time enable very low manufacturing costs and a technically simple production.

SUMMARY OF THE INVENTION

According to one aspect of the present invention, a motor vehicle column, in particular a B-column, includes an outer sheet with a hat-shaped cross section with a web, legs extending from the web and flanges protruding from the ends of the legs. In addition a closing sheet, which closes the outer sheet, is provided so that a hollow chamber with a closed cross section is formed between the outer sheet and the closing sheet. In the hollow chamber a reinforcement sheet is arranged. The reinforcement sheet has at least one bead, which extends in longitudinal direction, and at least two sections, which in the cross section form a double layer by contact with or together with the web and/or the legs of the outer sheet, and is preferably coupled with the outer sheet.

According to another aspect of the present invention a motor vehicle column, in particular B-column, includes an outer sheet having a hat-shaped cross section and a web, legs extending from the web and flanges protruding from ends of the legs; a closing sheet which closes the outer sheet and together with the outer sheet encloses a hollow chamber; and a reinforcement sheet arranged in the hollow chamber, and having at least one bead which extends in a longitudinal direction of the motor vehicle column, wherein the reinforcement sheet contacts the web in at least two sections so as to form a double layer at the at least two sections, wherein the bead is configured to protrude inwardly into the hollow chamber and together with the outer sheet forms a second hollow chamber.

According to another aspect of the present invention a motor vehicle column, in particular a B-column, includes an outer sheet having a hat-shaped cross section and a web, legs extending from the web and flanges protruding from ends of the legs; a closing sheet which closes the outer sheet and together with the outer sheet encloses a hollow chamber; and a reinforcement sheet arranged in the hollow chamber and having at least one bead which extends in a longitudinal direction of the motor vehicle column, wherein the reinforcement sheet contacts the web in at least two sections so as to form a double layer at the at least two sections, wherein the bead has a valley oriented toward the outer sheet, wherein the valley contacts an inner sheath surface of the web so that a second hollow chamber and a third hollow chamber are formed between the reinforcement sheet and the outer sheet.

The entire motor vehicle column is in particular a reinforcement column, which is used as structural component of the motor vehicle. The outer sheet does not necessarily have to be an outermost visual panel or outer panel of the motor vehicle body. The outer sheet can be covered by an additional outer panel component of the motor vehicle. Within the framework of the invention the outer sheet can however also be the outer panel of the motor vehicle body. In most cases a B-column is covered by the doors so that the outer panel only becomes visible to the observer when a door of the motor vehicle is open. Further according to the invention the motor vehicle column is preferably arranged between a roof pillar and a sill, wherein at least the outer sheet, preferably also the closing sheet and/or the reinforcement sheet, are coupled with the roof pillar and/or the sill.

For forming the double layered configuration the reinforcement sheet may in particular directly contact the inner sheath surface of the outer sheet. Within the framework of the invention however, the double layered configuration may also be formed by the reinforcement sheet resting against the outer sheet indirectly with interposition of another sheet or intermediate sheet between the reinforcement sheet and the outer sheet. Double layered means that one layer is the reinforcement sheet and another layer is the outer sheet. In the case of an intermediate sheet the corresponding section is three-layered. Within the framework of the invention two double layered sections means that in cross section the outer sheet and the reinforcement sheet contact each other in a double layered manner at two different sites.

The advantage according to the invention is that the components are produced separate from each other and it is thus possible to additionally provide the reinforcement sheet with a bead as reinforcement structure by forming. This further significantly increases the stiffness and the crash performance of the motor vehicle column while at most increasing the component weight of the entire arrangement only slightly, The additional material required for forming the bead can for example be saved by reducing the wall thickness in the outer sheet and/or the closing sheet so that the weigh to the components of the entire arrangement of the motor vehicle remains the same or is even reduced.

The hollow chamber formed between the closing sheet and the outer sheet is closed in cross section and is thus open at the top and bottom in longitudinal direction. It can however also be closed at the top or the bottom depending on the type of the course of the cross section in longitudinal direction. For forming the hollow chamber the closing sheet is coupled with the flanges of the hat shaped outer sheet, This coupling can for example be accomplished via gluing or thermal joining or a combination thereof, For example point welding can also be used again optionally together with gluing.

The configuration of the reinforcement sheet with a bead results in a second hollow chamber viewed in cross section. The reinforcement sheet is preferably arranged only in sections in the motor vehicle column in longitudinal direction, in particular over a longitudinal section of one-third to two thirds of the length or height of the entire motor vehicle column. Accordingly the double-chamber hollow profile is also only formed in this longitudinal section.

Further the reinforcement sheet rests flat against the web and/or the legs of the outer sheet at least in regions or in sections with regard to the cross section. Also in this case it is possible to couple and/or thermally join the reinforcement sheet at the contacting surfaces with the outer sheet for example by applying an adhesive, wherein also in this case preferably a point welding or a riveting method can be used.

According to another advantageous feature of the invention, the closing sheet does not have a linear course in cross section but also has a slightly hat-shaped cross sectional course, and also that the hat shape of the closing sheet faces in the direction of the hollow chamber of the motor vehicle column. Also this embodiment of the closing sheet again makes it possible to increase a significant increase in stiffness and crash performance, compared to an only slight increase in weight.

According to another advantageous feature of the invention, at least the outer sheet and/or the reinforcement sheet, optionally also the closing sheet, are made of a hot-formable and press-hardenable steel alloy. In particular regions or zones of different strengths are formed along the longitudinal extent by partial press-hardening. For example a lower foot region of the motor vehicle column can be configured harder than a center region and an upper head region. The same applies to the reinforcement sheet. Also in this case it is conceivable that the reinforcement sheet has regions of different strengths along its longitudinal extent. This makes it possible to adjust the demanded crash performance of the entire motor vehicle column in a targeted manner.

According to another advantageous feature of the invention, the bead of the reinforcement sheet in cross section is additionally covered by a bead closing sheet. The bead closing sheet is thus coupled with the reinforcement sheet so that a three-chamber profile, preferably a four chamber profile, is formed in cross section. For this it is for example conceivable within the framework of the invention that the reinforcement sheet is respectively coupled to the legs of the outer sheet and a sub-region, in particular a valley section of the bead, is coupled with the inside of the web of the outer sheet. The bead extending therebetween is closed by the bead closing sheet, wherein the bead closing sheet can be coupled with the reinforcement sheet. The bead closing sheet preferably extends only over a partial length section of the reinforcement sheet in longitudinal and/or in particular over the entire longitudinal extent of the bead.

According to another advantageous feature of the invention, an additional sheet can be interposed between the reinforcement sheet and the outer sheet, wherein the additional sheet particularly preferably contacts the web on the inside of the outer sheet at least in regions, in particular over its entire surface. The reinforcement sheet preferably contacts the additional sheet at least in regions. Within the framework of the invention this also means a patch arranged in the outer sheet and an additional coupling of the patch with the reinforcement sheet.

According to another advantageous feature of the invention, the cross sectional course of the reinforcement sheet and the cross sectional course of the bead are configured different from each other. In a particularly preferred embodiment the one bead transitions Y-shaped into two beads in longitudinal direction. For example in this way only one bead can be formed in a lower foot region, whereas in a transition region to a center region two beads are then formed. Preferably it is also conceivable that the reinforcement sheet has two spaced-apart beads over its entire longitudinal extent and/or that a width and/or depth of a bead decreases in longitudinal direction.

According to another advantageous feature of the invention, a blank with homogenous wall thickness can be used for each metal sheet, which in particular enables the forming of the metal blank and the at least partial hot-forming and press hardening to be performed simply, effectively and at low cost.

According to another advantageous feature of the invention, wall thicknesses of less than two millimeters can be used for the outer sheet so that the material costs and the work to be performed for the forming can be kept low and at the same time a low own weight of the entire component arrangement is achieved. Particularly preferably metal sheet thicknesses of 0.5 mm to 0.2 mm, in particular of 1 mm to 2 mm are used. This in particular results in the fact that Tailor Rolled Blank or Tailor Welded Blank materials do not have to be used, which enables lowering the total production costs.

According to another aspect of the invention a method for producing a motor vehicle column includes the steps of providing an outer sheet produced by hot-forming and at least partial press hardening, wherein the outer sheet has a hat-shaped cross section and a web, legs extending from the web and flanges protruding from ends of the legs; providing a formed reinforcement sheet having at least one bead which extends in a longitudinal direction of the motor vehicle column; coupling the outer sheet with the reinforcement sheet in the hat-shaped profile so that the reinforcement sheet contacts the web in at least two sections so as to form a double layer at the at least two sections, and so that the bead faces away from the web and together with the outer sheet forms a hollow chamber; and coupling the outer sheet with a closing sheet, wherein another hollow chamber is formed between the outer sheet and the closing sheet.

According to another aspect of the invention a method a method for producing a motor vehicle column includes the steps of providing an outer sheet produced by hot-forming and at least partial press hardening, said outer sheet having a hat-shaped cross section and a web, legs extending from the web and flanges protruding from ends of the legs; providing a formed reinforcement sheet having at least one bead which extends in a longitudinal direction of the motor vehicle column; coupling the reinforcement sheet with the outer sheet in the hat-shaped profile so that the reinforcement sheet contacts the web in at least two sections so as to form a double layer at the at least two sections, and so that a valley of the bead is oriented toward the outer sheet, and the valley contacts an inner sheath surface of the web so that a first and a second hollow chamber and a third hollow chamber are formed between the reinforcement sheet and the outer sheet; and coupling the outer sheet with a closing sheet, wherein another hollow chamber is formed between the outer sheet and the closing sheet.

It is thus possible to form and optionally temper, in particular harden, the outer sheet and the reinforcement sheet separately. Subsequently the components are then coupled with each other, in particular by gluing at least in regions and/or thermal joining and/or riveting. When the reinforcement sheet is inserted into the outer sheet the outer sheet is closed with the closing sheet so as to form a hollow chamber at least in one longitudinal section.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
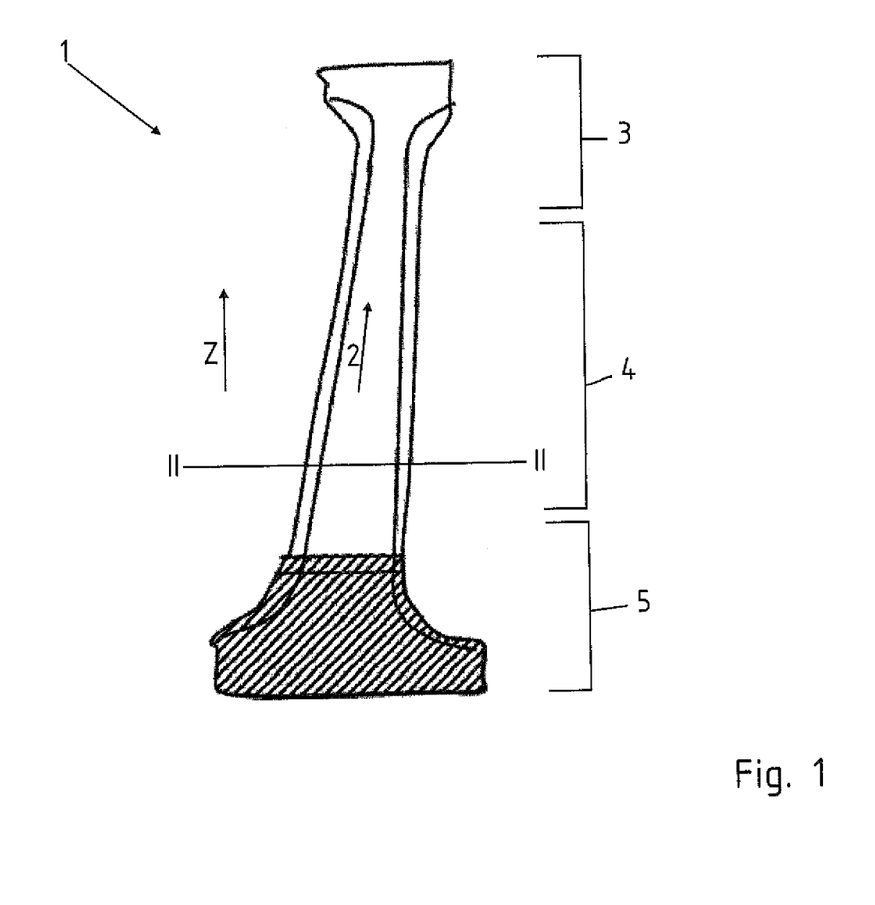
FIG. 1 is a side view of a motor vehicle column.

Turning now to the drawing, and in particular to FIG. 1, there is shown a side view of a motor vehicle column 1 according to the invention, for example in the form of a B-column. The longitudinal direction 2 of the motor vehicle column 1 extends hereby in Z-direction of the motor vehicle. The motor vehicle column 1 has an upper head region 3, a middle region 4 and a lower foot region 5. In the head region 3 and in the foot region 5 respective transverse extents for connection of a not further shown roof pillar or sill are shown.

Figure 2A:
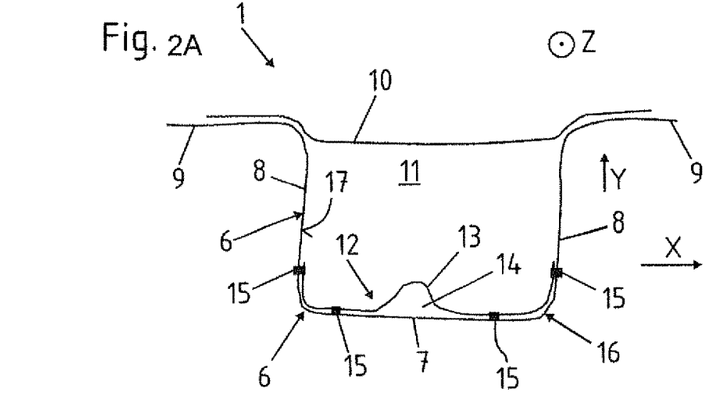
FIG. 2A is a cross sectional view of an embodiment according to the invention taken along sectional line II-II of FIG. 1.

The inventive features are shown in FIGS. 2a) to 2g) which respectively show a cross sectional view through the motor vehicle column 1 according to the sectional line II-II in FIG. 1. According to this a hat-shaped extending outer sheet 6 is arranged. The latter has a web 7, which substantially extends in X-direction, and legs 8 which extend from the web and which preferably extend in motor vehicle direction Y. Arranged on the legs 8 are flanges 9, which extend in motor vehicle longitudinal direction X. At the rear side the hat-shaped outer sheet 6 is closed by a closing sheet 10, wherein the closing sheet 10 can also have a hat-shaped configuration. The closing sheet 10 is coupled with the flanges 9 mainly via a here not further shown connection, and can be coupled for example by gluing or material joining. A first hollow chamber 11 is formed between the closing sheet 10 and the outer sheet 6. This also applies to all variants according to FIGS. 2a) to 2g).

According to the invention according to FIG. 2a) a reinforcement sheet 12 is arranged in this hollow chamber 11, so that between the reinforcement sheet 12 and the outer sheet 6, and here concretely between the bead 13 and the outer sheet 6, a second hollow chamber 14 is formed. The two hollow chambers 11, 14 result in a high stiffness in motor vehicle transverse direction Y at good crash performance and low component weight. The reinforcement sheet 12 is further coupled with the outer sheet 6 via coupling sites 15, here for example illustrated as point welding. Further the reinforcement sheet 12 contacts the inner sheath surface 17 of the outer sheet 6 in at least two sections 16 so as to form a double layer. In the embodiment according to FIG. 2a) the double layered section 16 is configured respectively in the region of the web 7 and partially in the region of the leg 8.

Figure 2B:
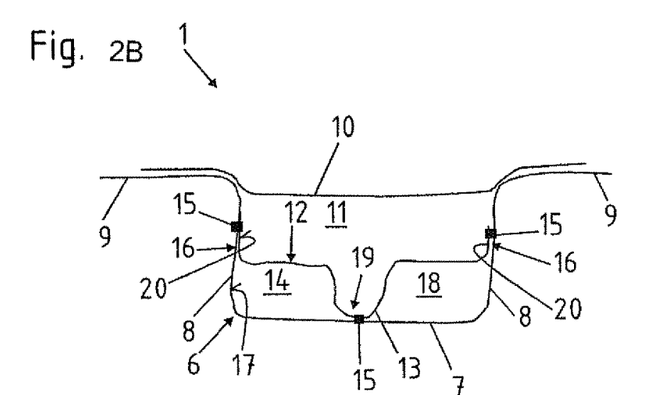
FIG. 2B is a cross sectional view of another embodiment according to the invention taken along sectional line II-II of FIG. 1.

FIG. 2b) shows a further embodiment of the motor vehicle column 1 according to the invention in cross section. In contrast to FIG. 2a) however the bead 13 in this case is not configured to protrude inwards into the hollow chamber 11 but so as to protrude out of the hollow chamber 11 in the opposite direction. Thus a second hollow chamber 14 and a third hollow chamber 18 are formed so that the bead 13 of the reinforcement sheet 12 is oriented outwardly in the direction of the outer sheet 6 and contacts the inner sheath surface 17 of the web 7 with a valley 19 and is also coupled with the web 7 via coupling site 15. Further, two side flanges 20 of the reinforcement sheet 12 are configured so as to from the section of the double layer with the outer sheet 6. For this the side flanges 20 contact the inner sheath surface 17 of the legs 8 and are also in this case coupled via coupling sites 15. The proportion of the cross sectional surface of the second hollow chamber 14 or the proportion of the cross sectional surface of the third hollow chamber 18 are preferably between 10% and 50%, in particular between 25% and 33.3% of the total cross sectional surface of the motor vehicle column 1. The percent distribution of the stated cross sections applies to all embodiments of FIG. 2.

Figure 2C:
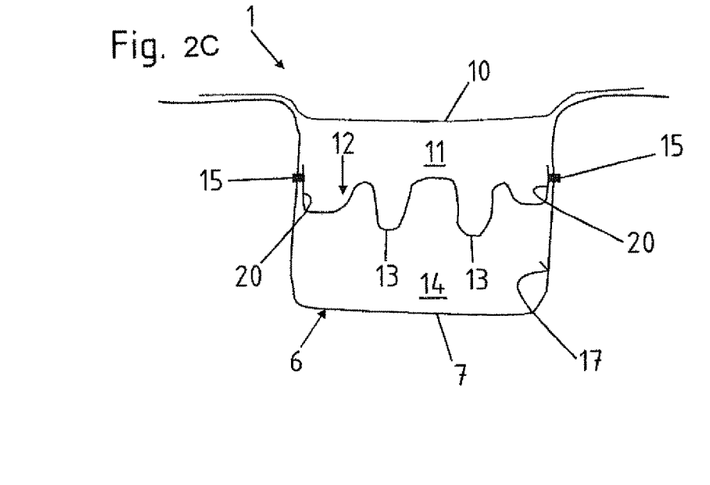
FIG. 2C is a cross sectional view of another embodiment according to the invention taken along sectional line II-II of FIG. 1.

FIG. 2c) shows a third alternative in which the reinforcement sheet 12 is configured so that it essentially has two outwardly facing beads 13 and is divided with regard to the cross section of the motor vehicle column 1 so that a first hollow chamber 11 and a second hollow chamber 14 are formed. Also in this case the reinforcement sheet 12 is coupled with the inner sheath surface 17 of the outer sheet 6 via side flanges 20 and so as to contact the inner sheath surfaces 17 and is coupled with the outer sheet 6 via coupling sites 15. Also a closing sheet 10 is arranged. It is also possible to position the reinforcement sheet 12 so that the two beads 13 contact, and are coupled with, the web in analogy to FIG. 2b).

Figure 2D:
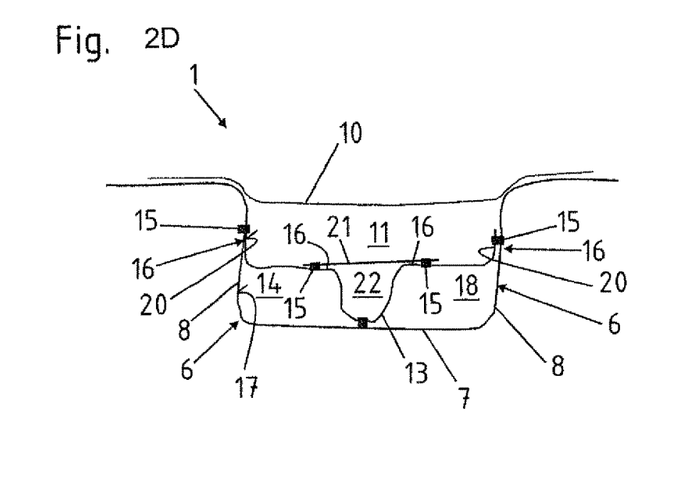
FIG. 2D is a cross sectional view of another embodiment according to the invention taken along sectional line of FIG. 1.

FIG. 2d) shows a fourth embodiment of the motor vehicle column 1 according to the invention in cross section. In this embodiment the hat-shaped outer sheet 6 is again closed on its rear side by the closing sheet 10 for forming a first hollow chamber 11. In analogy to FIG. 2b) a reinforcement sheet 12 is arranged with a bead which is oriented outwardly toward the web 7 so that a second and third hollow chamber 14, 18 are formed. In addition a bead closing sheet 21 is formed so that a fourth hollow chamber 22 is formed. For this purpose the bead closing sheet 21 is coupled with the reinforcement sheet 12 at different coupling sites 15. Also in this case the bead closing sheet 21 overlaps with the reinforcement sheet 12 at least in two double layered sections 16.

Figure 2E:
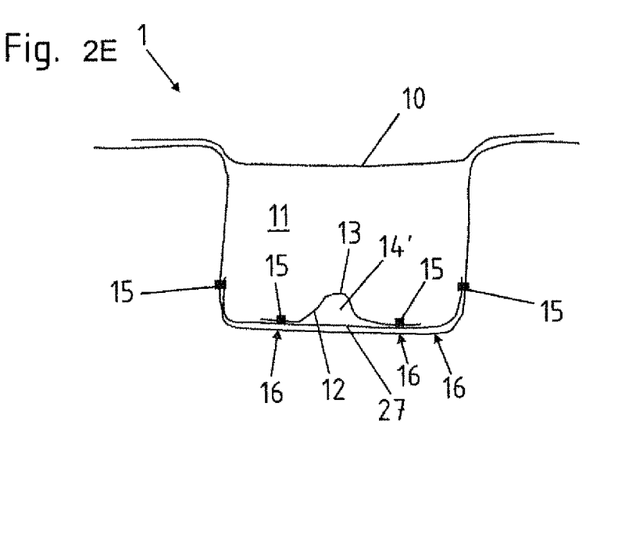
FIG. 2E is a cross sectional view of another embodiment according to the invention taken along sectional line II-II of FIG. 1.

FIG. 2e) shows a further alternative embodiment of the motor vehicle column 1 according to the invention. In contrast to the embodiment of FIG. 2a) in this case an additional metal sheet 27 in the form of a patch is arranged when viewed in cross section so as to contact a predominant portion of the inner sheath surface 17 of the outer sheet 6 and is coupled with the outer sheet 6 via coupling sites 15. The reinforcement sheet 12 with the bead 13 that is directed into the first hollow chamber 11 for forming a second hollow chamber 12, is then arranged so as to contact the sheet 27 from inside. The reinforcement sheet 12 is coupled with the sheet 27 via coupling sites 15 where it is configured double layered or together with the outer sheet 6 three layered. The coupling sites 15 of the reinforcement sheet 12 can traverse the sheet 27 and can be coupled with the outer sheet 6 so that a three-layered coupling for example in the form of a point welding or the like is provided. Again this is closed by a closing sheet is arranged at the rear.

Figure 2F:
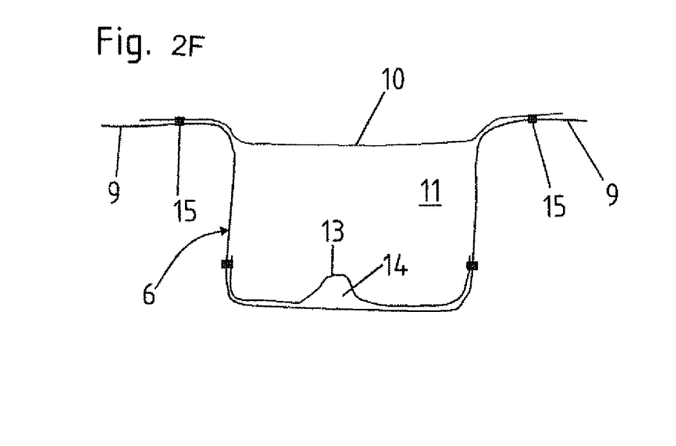
FIG. 2F is a cross sectional view of another embodiment according to the invention taken along sectional line II-II of FIG. 1.

FIG. 2f) shows an analogous embodiment to that of FIG. 2a), wherein in this case the closing sheet 10 is additionally coupled with the outer sheet 6 in the region of the flanges 9 via coupling sites 15.

Figure 2G:
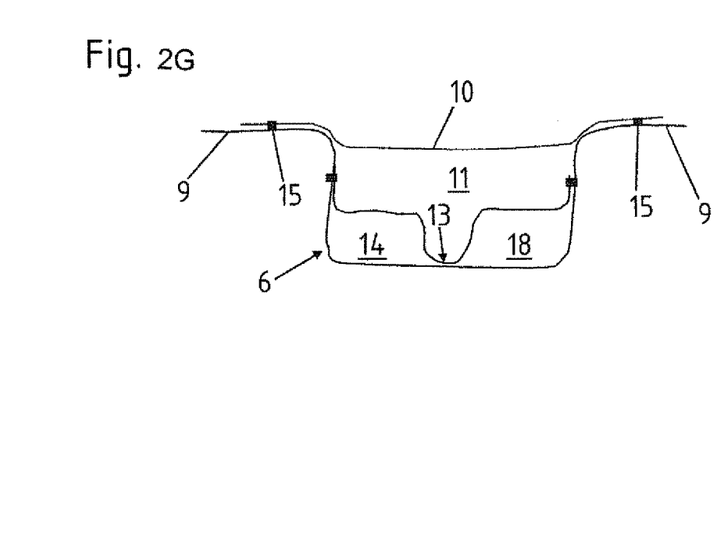
FIG. 2G is a cross sectional view of another embodiment according to the invention taken along sectional line II-II of FIG. 1.

FIG. 2g) shows a configuration analogous to that of FIG. 2b), wherein also in this case in the region of the flanges 9 the closing sheet 10 is coupled via coupling sites 15 with the flanges 9, and the bead 13 is not separately coupled.

Figure 3A:
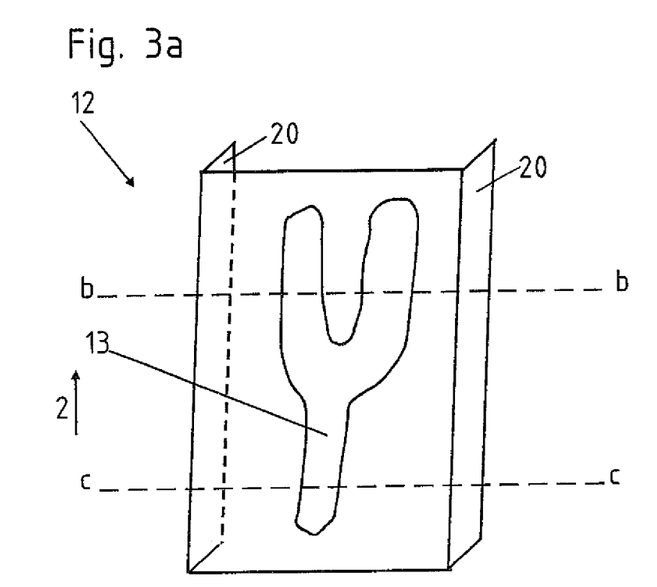
FIG. 3A shows a schematic perspective view of a reinforcement sheet according to the invention with a bead extending Y-shaped in longitudinal direction.
Figure 3B:
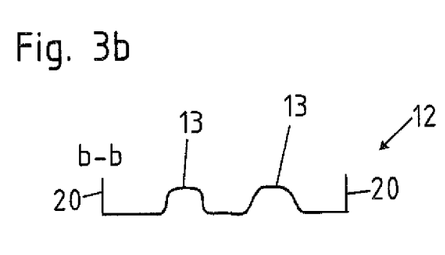
FIG. 3B shows a cross sectional view of the reinforcement sheet according to FIG. 3A taken along line b-b.
Figure 3C:
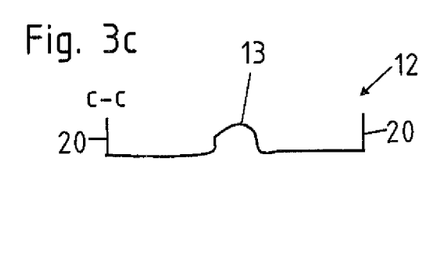
FIG. 3C shows a cross sectional view of the reinforcement sheet according to FIG. 3A taken along line c-c.

FIGS. 3a) to 3c) show a reinforcement sheet 12 in which a cross sectional course of the bead 13 changes in longitudinal direction 2, and two side flanges 20 for coupling with the legs 8 of the outer sheet 6. For this purpose the bead 13 is configured to extend Y-shaped in longitudinal direction. In a lower region of the image plane the bead 13 is configured one-piece, illustrated clearly in sectional line c-c. Sectional line b-b of FIG. 3b) clearly shows that in the upper region of the image plane two beads 13 are formed. The reinforcement sheet 12 can then be used in all embodiments according to FIGS. 2a) to 2g).

Figure 4A:
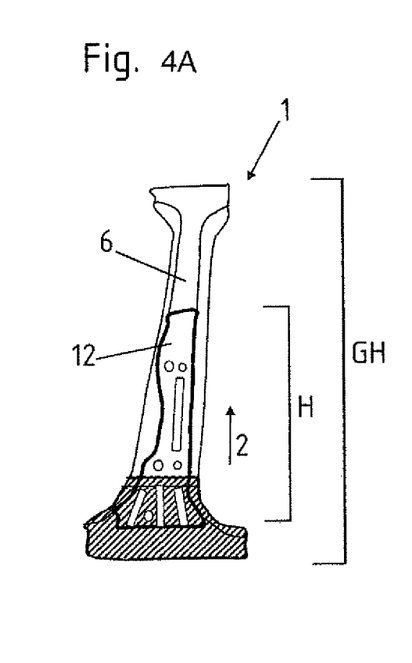
FIG. 4A shows a rear perspective view of a first embodiment of a motor vehicle column with an outer sheet and a reinforcement sheet.
Figure 4B:
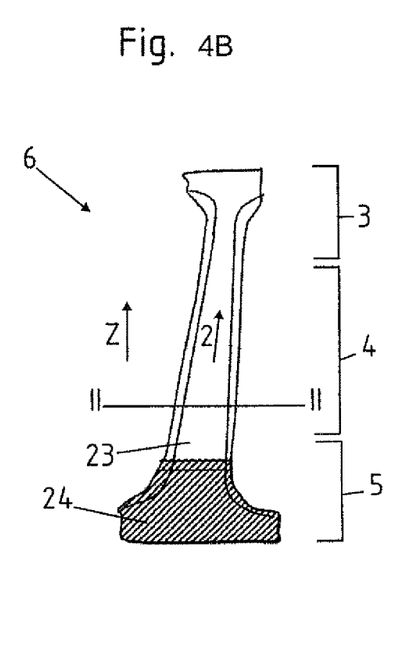
FIG. 4B shows the first embodiment of according to FIG. 4A without the outer sheet.
Figure 4C:
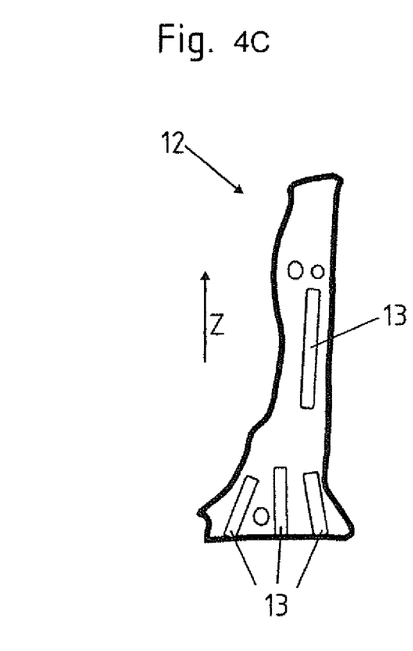
FIG. 4C shows a plan view of the outer sheet of the first embodiment of FIG. 4A
Figure 5A:
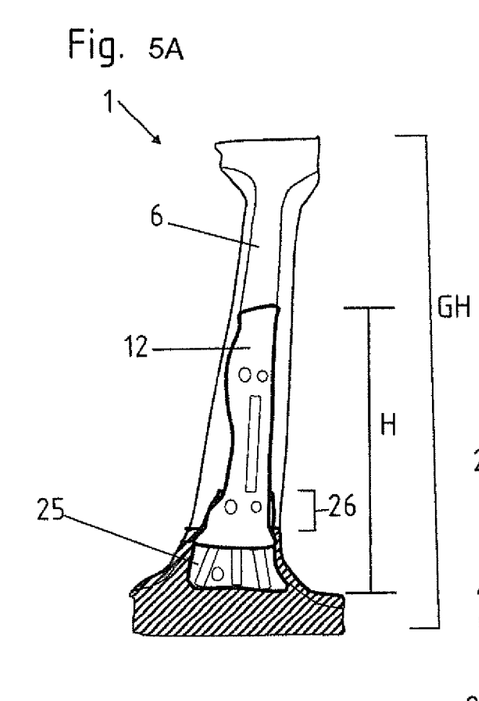
FIG. 5A shows a rear view of a second embodiment of a motor vehicle column with two reinforcement sheets.
Figure 5B:
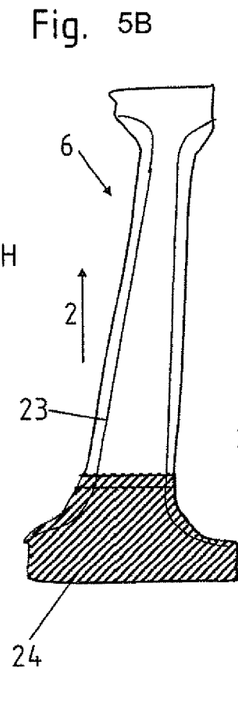
FIG. 5B shows the second embodiment of according to FIG. 5A without the reinforcement sheets.
Figure 5C:
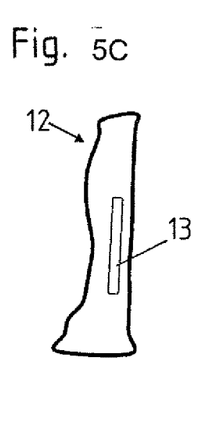
FIG. 5C shows a plan view of one of the reinforcement sheets of the second embodiment of FIG. 5A.
Figure 5D:
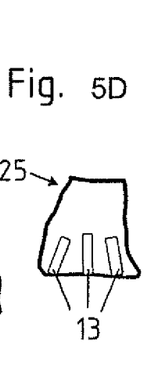
FIG. 5D shows a plan view of another one of the reinforcement sheets of the second embodiment of FIG. 5A

FIGS. 4a) to 4c) show a first embodiment of the motor vehicle column 1 according to the invention, wherein in FIG. 4a) the outer sheet 6 and the reinforcement sheet 12 are shown in a rear view, in FIG. 4b) only the outer sheet 6 is shown and in FIG. 4c) only the reinforcement sheet 12 is shown. It can be clearly seen that in the reinforcement sheet 12 in a middle region 4 one bead 13 is formed and in a foot region 5 three beads 13 are formed, which extend in longitudinal direction 2. When the closing sheet 10, which is not further shown, is attached the beads 13 arranged in the middle region 4 thus form a two chamber profile and the beads 13 arranged in the foot region 5 form an at least four chamber profile. The reinforcement sheet 12 hereby extends in longitudinal direction of the reinforcement sheet 12 over the height section H, which is located between ⅓ and ⅔, preferably about half of the overall height GH of the outer sheet 6. It can also be recognized in FIG. 4b) that two zones 23, 24 of different strength are formed, wherein a first zone 23 has a strength which extends over the middle region 4 and head region 3 and in the foot region 5 a second zone 24 is formed. The second zone 24 has a lower strength than the first zone 23. This strength is then further increased by the arrangement of three beads 13 according to the reinforcement sheet 12. According to the invention it is also possible that the zone 24 having the lower strength does not extend up to the lower end of the first region 5 but a further ultra-high strength border follows. The region of lower strength would then only extend 30 cm to 150 cm high. A further soft zone can be formed in the flanges 8 of the outer sheet 6 for example for coupling with the closing sheet 10 by welding or in particular riveting. This also applies to the further embodiments of the invention, FIGS. 5a) to 5d) show a second embodiment of the motor vehicle column 1. FIG. 5a) clearly shows that again the outer sheet 6 is arranged with a first reinforcement sheet 12 and a second reinforcement sheet 25. The first and the second reinforcement sheet 12, 25 overlap in an overlap region 26 in longitudinal direction 2 at least in regions. The outer sheet 6 is again configured to have two different zones 23, 24 of different strengths. The second reinforcement sheet 25, which is arranged in the foot region 5 of the outer sheet 6, again has three beads 13. The first reinforcement sheet 12 has one bead 13. All beads 13 are arranged oriented in longitudinal direction 2 or extend respectively partially over the longitudinal extent of the reinforcement sheets 12, 25. The reinforcement sheets 12, 25 themselves also only extend in regions in longitudinal direction 2 of the outer sheet 6 and cover a height range H between ⅓ and ⅔ of the total height GH of the outer sheet 6.

Figure 6A:
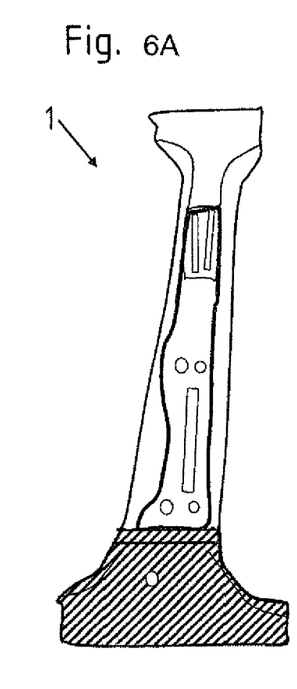
FIG. 6A shows a rear view of a third embodiment of a motor vehicle column according to the invention with a two-part reinforcement sheet
Figure 6B:
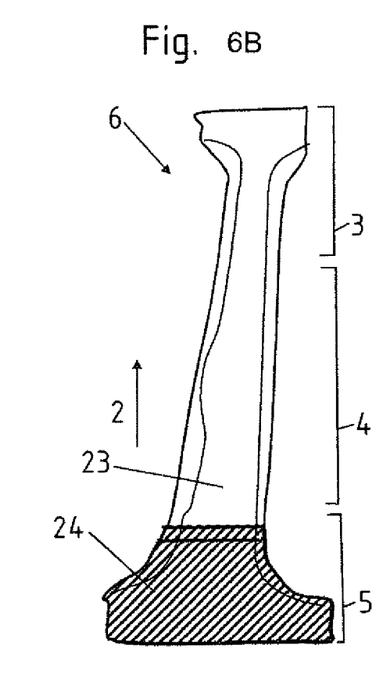
FIG. 6B shows the third embodiment of according to FIG. 6A without the two-part reinforcement sheet.
Figure 6C:
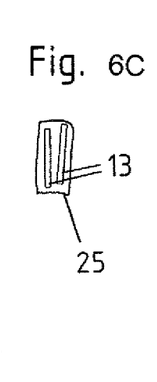
FIG. 6C shows a plan view of one part of the two-part reinforcement sheet of the second embodiment of FIG. 6A.
Figure 6D:
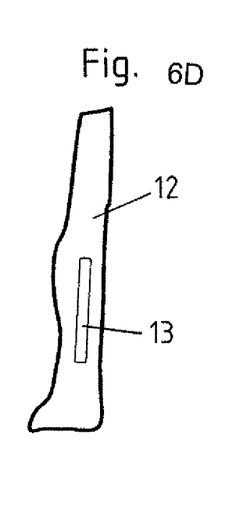
FIG. 6D shows a plan view of another part of the two-part reinforcement sheet of the second embodiment of FIG. GA.

FIGS. 6a) to 6d) show a third embodiment also with a two-part reinforcement sheet 12, wherein the outer sheet 6 according to FIG. 6b) is analogous to FIGS. 4b) and 5b) with two zones 23, 24 of different strengths. However, in this case the second reinforcement sheet 25 is not arranged in the foot region 5 but in the transition region from the middle region 4 to the head region 3 and has in longitudinal direction two beads 13. The second reinforcement sheet 25 is hereby completely overlapped in longitudinal direction by the first reinforcement sheet 12 with only one bead 13. The bead 13 of the first reinforcement sheet 12 is formed only in regions in longitudinal direction 2.

What is claimed as new and desired to be protected by Letters Patent is set forth in the appended claims and includes equivalents of the elements recited therein:

1. A motor vehicle column, in particular B-column, comprising:
    an outer sheet having a hat-shaped cross section and a web, legs extending from the web and flanges protruding from ends of the legs;
    a closing sheet which closes the outer sheet and together with the outer sheet encloses a first hollow chamber;
    a reinforcement sheet arranged in the first hollow chamber and having at least one bead which extends inwardly away from the web into the first hollow chamber in a longitudinal direction of the motor vehicle column, said reinforcement sheet contacting the web in at least two sections at a distance to the at least one bead so as to form a double layer at the at least two sections, said at least one bead demarcating with the outer sheet a further hollow chamber separate from the first hollow chamber; and
    an upper head region and a lower foot region, said reinforcement sheet sized in the longitudinal direction at a length sufficient to extend into the lower foot region.

2. The motor vehicle column of claim 1, wherein the reinforcement sheet is coupled at least in regions with the outer sheet in the double layered sections.

3. The motor vehicle column of claim 2, wherein the reinforcement sheet is coupled with the outer sheet by material bonding.

4. The motor vehicle column of claim 1, wherein the outer sheet and/or the reinforcement sheet are made of a hardenable steel alloy.

5. The motor vehicle column of claim 4, wherein at least regions of the outer sheet and/or the reinforcement sheet are hot formed and press-hardened.

6. The motor vehicle column of claim 1, further comprising a bead closing sheet which closes the bead of the reinforcement sheet.

7. The motor vehicle column of claim 6, wherein the bead closing sheet extends over only a part of a longitudinal extent of the reinforcement sheet.

8. The motor vehicle column of claim 1, wherein in at least a portion of the longitudinal extent of the motor vehicle column as viewed in cross section a three-chamber profile or four chamber profile is formed.

9. The motor vehicle of claim 1, wherein the at least two spaced apart beads comprise at least a first bead in a middle region of a longitudinal extent of the reinforcement sheet and a shorter second bead in a longitudinal extent of a lower region of the reinforcement sheet.

10. The motor vehicle of claim 1, further comprising a further sheet arranged between the reinforcement sheet and the outer sheet.

11. The motor vehicle column of claim 1, wherein a cross sectional course of the bead changes along a longitudinal extent of the bead.

12. The motor vehicle column of claim 11, wherein the bead transitions in longitudinal direction into two beads.

13. The motor vehicle column of claim 1, wherein the lower foot region is harder than the upper head region.

14. The motor vehicle column of claim 1, wherein the outer sheet has a first length, said reinforcement sheet defined by a second length which is about ⅓ to ⅔ of the first length.

* * * * *